United States Patent
Chiang et al.

(10) Patent No.: US 9,946,728 B2
(45) Date of Patent: Apr. 17, 2018

(54) CLOUD SERVICE SYSTEM AND METHOD THEREOF

(71) Applicant: Quanta Computer Inc., Taoyuan (TW)

(72) Inventors: Chia-Chen Chiang, Taoyuan (TW);
Meng-Yu Li, Taoyuan (TW);
Chun-Hung Chen, Taoyuan (TW);
Tien-Chin Fang, Taoyuan (TW);
Chen-Chung Lee, Nantou County (TW)

(73) Assignee: QUANTA COMPUTER INC., Taoyuan (TW)

( * ) Notice: Subject to any disclaimer, the term of this patent is extended or adjusted under 35 U.S.C. 154(b) by 367 days.

(21) Appl. No.: 14/797,889

(22) Filed: Jul. 13, 2015

(65) Prior Publication Data
US 2016/0328417 A1 Nov. 10, 2016

(30) Foreign Application Priority Data
May 8, 2015 (TW) .............................. 104114769 A

(51) Int. Cl.
G06F 17/30 (2006.01)
G06F 9/445 (2018.01)
G06F 3/06 (2006.01)

(52) U.S. Cl.
CPC .......... *G06F 17/30203* (2013.01); *G06F 3/06* (2013.01); *G06F 8/60* (2013.01); *G06F 8/65* (2013.01); *G06F 17/3007* (2013.01)

(58) Field of Classification Search
CPC ..... G06F 3/06; G06F 8/60; G06F 8/65; G07F 17/30203; G07F 17/3007
See application file for complete search history.

(56) References Cited

U.S. PATENT DOCUMENTS

| 8,527,980 | B2 | 9/2013 | Stich et al. |
| 8,799,413 | B2 | 8/2014 | Taylor et al. |
| 8,805,971 | B1 * | 8/2014 | Roth ..................... G06F 9/5072 709/203 |
| 8,954,741 | B2 * | 2/2015 | Suh ........................ G06F 9/5072 709/223 |
| 2012/0089971 | A1 * | 4/2012 | Williams ................. G06F 8/61 717/167 |
| 2012/0101995 | A1 * | 4/2012 | Agetsuma ............. G06F 3/0605 707/644 |
| 2014/0344892 | A1 * | 11/2014 | Liang ..................... H04L 67/06 726/3 |

(Continued)

FOREIGN PATENT DOCUMENTS

TW 201346804 A 11/2013
TW 201439911 A 10/2014

*Primary Examiner* — Kris E Mackes
*Assistant Examiner* — Thuy T Bui
(74) *Attorney, Agent, or Firm* — Rabin & Berdo, P.C.

(57) ABSTRACT

A cloud service system and a cloud service method thereof are disclosed herein. The cloud service method includes the following steps. A target file is downloaded to a private cloud system. A resource allocation setting corresponding to the target file is obtained. A resource establishment is automatically deployed according to the resource allocation setting, and the target file is installed on the resource allocation setting. A data structure and a default data corresponding to the target file are configured automatically.

4 Claims, 6 Drawing Sheets

(56) References Cited

U.S. PATENT DOCUMENTS

2015/0154211 A1* 6/2015 Matsubara .............. H04L 67/42
  707/812
2016/0057253 A1* 2/2016 Zhou .................... H04W 84/12
  709/203

* cited by examiner

CLOUD SERVICE SYSTEM AND METHOD THEREOF

RELATED APPLICATIONS

This application claims priority to Taiwanese Application Serial Number 104114769, filed May 8, 2015, which is herein incorporated by reference.

BACKGROUND

Field of Disclosure

The present disclosure relates to a cloud service system. More particularly, the present disclosure relates to an automatic cloud service system and method thereof.

Description of Related Art

So far, the services related to the cloud system have become an essential network service to indivisival and enterprise. The present developing software of cloud system only can use in cloud environment chosed by user to meet the specificity of cloud environment. If the software of cloud system needs to be combined with the specific application or database of inter-enterprise, the network environment needs to be configured for combining the software with the specific application or database of inter-enterprise. Beside, not all the inter-enterprise have considerable cloud integration system to allocate the application into the network environment.

Further, the safety issue needs to be concerned when the related service data of the enterprise needs to be accessed by the external network. Besides, the data type obtained from the external network may cause the situation that the data type cannot combine with application system of database of the inter-enterprise. Moreover, if enterprise purchases the software systems by the external network, the software systems need to be deployed and implemented verbosely on the private cloud of enterprise for employees. On the other hand, if user finds a nice service on the public cloud, but the service is a private service, which cannot be purchased. In this situation, user needs to use this service on the public cloud. However, user cannot use the software of public cloud system if the network environment of inter-enterprise cannot connect to the public cloud system. Therefore, the method above mentioned still exists the inconvenience and deficiency and needs to be further improved.

SUMMARY

An aspect of the present invention is to provide a cloud service method to solve the problems above described. The cloud service method includes following steps: downloading a target file to a private cloud system; obtaining a resource allocation setting corresponding to the target file; automatically deploying a resource implementation according to the resource allocation setting and installing the target file on the resource implementation; and automatically setting a database structure and a default data corresponding to the target file.

According to another embodiment of the present disclosure, the target file includes a software program and an environment setting information corresponding to the software program, and the step of obtaining the resource allocation setting corresponding to the target file further including: adjusting the environment setting information or using the default environment setting information to determine the resource allocation setting.

According to another embodiment of the present disclosure, wherein the step of automatically deploying the resource implementation according to the resource allocation setting further includes: determining whether the private cloud system exists the resource implementation corresponding the resource allocation setting; if the private cloud system exists the resource implementation corresponding the resource allocation setting, the software program is automatically installed on the resource implementation; if the private cloud system does not exist the resource implementation corresponding the resource allocation setting, the resource implementation is automatically deployed according to the resource allocation setting.

According to another embodiment of the present disclosure, wherein before the step of automatically setting the database structure and the default data corresponding to the target file further includes: combining a user data to the default data, and storing the combined default data according to the data structure.

According to another embodiment of the present disclosure, wherein before the step of downloading the target file to the private cloud system includes: transmitting a subscription information to a public cloud system; receiving a connection from the public cloud system; downloading the target file to the private cloud system according to the connection.

According to another embodiment of the present disclosure, further including: setting a network address corresponding to the target file; displaying the network address on a user operation interface; and transmitting a notification.

According to another embodiment of the present disclosure, further including: receiving an update information; downloading an update file; automatically installing the update file on the resource implementation; and automatically updating the database structure and the default data corresponding to the update file.

According to another embodiment of the present disclosure, wherein the step of automatically installing the update file on the resource implementation further includes: determining whether an update allocation setting corresponding to the update file is the same as the resource allocation setting corresponding to target file; if the update allocation setting corresponding to the update file is not the same as the resource allocation setting corresponding to target file, the resource implementation is automatically updated according to the update allocation setting; if the update allocation setting corresponding to the update file is the same as the resource allocation setting corresponding to target file, the update file is directly installed on the resource implementation.

Another aspect of the present invention is to provide a cloud service system to solve the problems above described. The cloud service system includes a transmitting module and a processing unit. The processing unit includes a resource allocation module, a deploying module and a database setting module. The transmitting module uses for downloading a target file to a private cloud system. The resource allocation module uses for obtaining a resource allocation setting corresponding to the target file. The deploying module uses for automatically deploying a resource implementation according to the resource allocation setting and installing the target file on the resource implementation. The database setting module uses for automatically setting a database structure and a default data corresponding to the target file.

According to another embodiment of the present disclosure, the target file includes a software program and an environment setting information corresponding to the software program, and the resource allocation module further uses for adjusting the environment setting information or using the default environment setting information to determine the resource allocation setting.

According to another embodiment of the present disclosure, the cloud service system further includes: a resource implementation module uses for determining whether the private cloud system exists the resource implementation corresponding the resource allocation setting; if the private cloud system exists the resource implementation corresponding the resource allocation setting, the resource implementation module automatically installs the software program on the resource implementation; if the private cloud system does not exist the resource implementation corresponding the resource allocation setting, the resource implementation module automatically deploys the resource implementation according to the resource allocation setting.

According to another embodiment of the present disclosure, the database setting module further uses for combining a user data to the default data, and storing the combined default data according to the data structure.

According to another embodiment of the present disclosure, further include: the transmitting module transmits a subscription information to a public cloud system and receives a connection from the public cloud system; and the transmitting module downloads the target file to the private cloud system according to the connection.

According to another embodiment of the present disclosure, the cloud service system further includes: a user operation interface uses for displaying the network address corresponding to the network address and transmitting a notification.

According to another embodiment of the present disclosure, the cloud service system further includes: receiving an update information and downloading an update file by the transmitting module; automatically installing the update file on the resource implementation by the deploying module; and automatically updating the database structure and the default data corresponding to the update file by the database setting module.

According to another embodiment of the present disclosure, the cloud service system further includes: a resource implementation module uses for determining whether an update allocation setting corresponding to the update file is the same as the resource allocation setting corresponding to target file; if the update allocation setting corresponding to the update file is not the same as the resource allocation setting corresponding to target file, the resource implementation module automatically updates the resource implementation according to the update allocation setting; if the update allocation setting corresponding to the update file is the same as the resource allocation setting corresponding to target file, the resource implementation module directly installs the update file on the resource implementation.

Base on above-mentioned, comparing the present technical feature to the related art, the present application has clearly advantage and beneficial effect. By the technical feature above-mentioned, it may achieve substantial improvement of technology. The technical feature above mentioned also has the widely usage of industry. The present disclosure can help user to subscribe the software on the public cloud system and automatically download the software system to the private cloud of enterprise. The administrator may allocate the software or hardware resource to determine whether to use the existing virtual software or hardware device or set up a new virtual environment for deploying the software into the environment of the enterprise.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
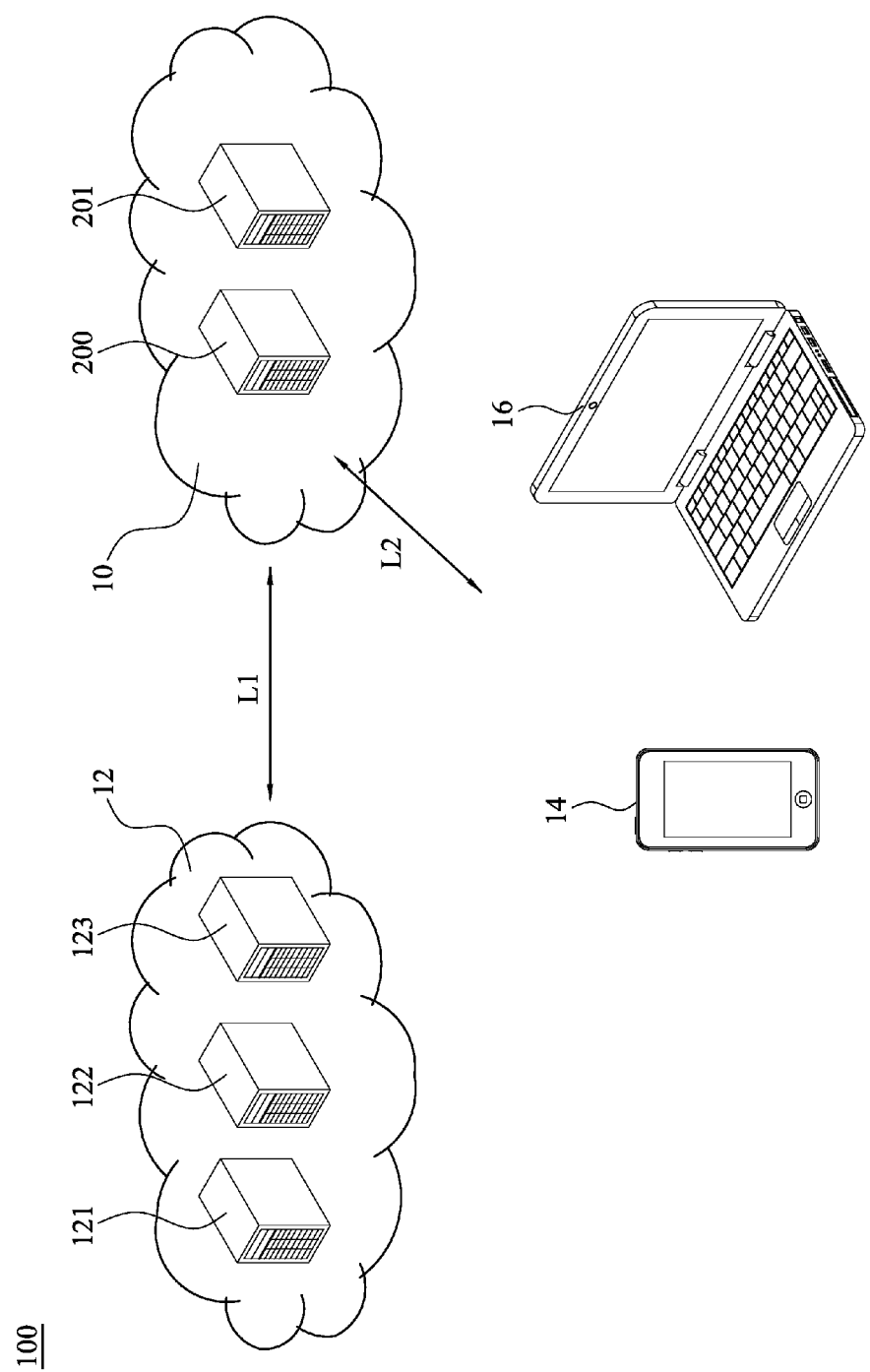
FIG. 1 is a schematic diagram illustrating a cloud service system according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 2:
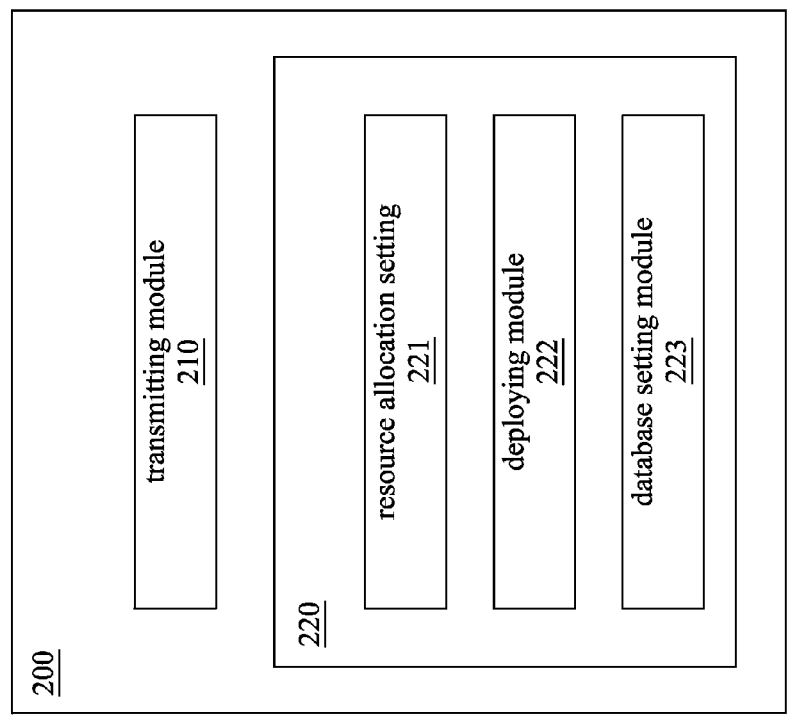
FIG. 2 is a functional block diagram illustrating a private cloud server according to an embodiment of the disclosure.
Figure 3:
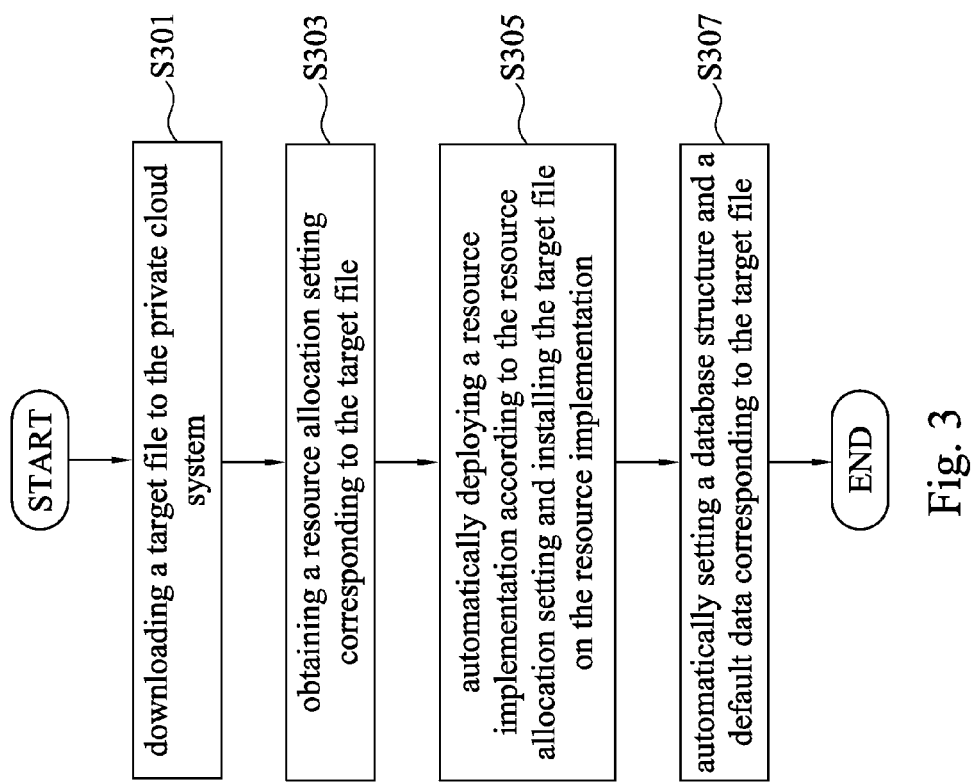
FIG. 3 is a flow chart of a cloud service method according to an embodiment of the disclosure.

Referring to FIGS. 1-3, FIG. 1 is a schematic diagram illustrating a cloud service system according to an embodiment of the disclosure. FIG. 2 is a functional block diagram illustrating a private cloud server according to an embodiment of the disclosure. FIG. 3 is a flow chart of a cloud service method according to an embodiment of the disclosure.

As shown in FIG. 1, a cloud service 100 includes a private cloud system 10 and a public cloud system 12. The public cloud system 12 can transmit information to the private cloud system 10 through the communication link L1. The private cloud system 10 includes server 200, 201 and electronic device 14, 16. For example, the private cloud system 10 can be an internal cloud system of an enterprise. The server 200, 201 can transmit information to the electronic device 14, 16 through a connection link L2. The electric device 14, 16, for example, can be a personal computer, a smart phone, a panel device or a smart TV. The public cloud system 12 includes server 121, 122 and 123. For example, the public cloud system 12 can be an external public cloud system of an enterprise. For instance, the connection link L1, L2 can transmit information by TCP/IP network protocol and/or bluetooth.

As shown in FIG. 2, the server 200 of the private cloud system 10 includes a transmitting module 210 and a processing unit 220. The processing unit 220 includes a resource allocation module 221, a deploying module 222, a database setting module 223. The transmitting module 210 can be implemented by integrated circuit, such as a micro controller, a microprocessor, a digital signal processor, an application specific integrated circuit (ASIC) or a logical circuit.

Next, referring to FIG. 3, in the step 301, the transmitting module 210 uses for downloading a target file to the private cloud system 10. The target file includes a software program and an environment setting information corresponding to the software program.

For example, when a user of electronic device 14 browses (or finds) a nice service (e.g. one or more software products) on a public cloud system 12, the user can download the target file corresponding the service to the private cloud system 10 by the transmitting module 210 of private cloud system 10 after the user purchases or be agreed to obtain the service. In an embodiment, user can subscript the services of the public cloud system 10 to enable the transmitting module 210 of private cloud system 10 to download the update service automatically and regularly.

In step S303, the resource allocation module 221 obtains a resource allocation setting corresponding to the target file. In one embodiment, the resource allocation module 221 can determine the resource allocation by adjusting the environment setting information downloaded in step S301 or directly using the default environment settings.

For instance, the environment setting information downloaded in step S301 is the basic requirement (or the optimization requirement) of the downloaded target file and the service. If the basic requirement (or the optimization requirement) needs three virtual machines and two databases for normal operation (or for smoothly processing optimal operation), the resource allocation module 221 can directly and automatically determine the resource allocation settings from private cloud system 10 to support the target file of the added service. For example, the resource allocation settings determine providing three virtual machines and two databases from private cloud system 10. In practice, the content of the resource allocation settings can be dynamically adjusted according to the amount of resources of private cloud system 10. For example, the resource allocation module 221 automatically determines (or user manually inputs) that the resource allocation setting is four virtual machines and three databases when the private cloud system 10 has sufficient resources. On the other hand, the resource allocation module 221 automatically determines (or user manually inputs) that the resource allocation setting is two virtual machines and one database when the private cloud system 10 has insufficient resources, and so on.

By this step, the cloud service system can configure the virtual resources to be mounted on the private cloud system 10 for operating the software. And, the step can determine to mount the existing virtual resources or to create a new virtual environment according to the environment setting information.

In step S305, the deploying module 222 automatically deploys a resource implementation according to the resource allocation setting and installing the target file on the resource implementation. For example, the deploying module 222 automatically creates three virtual machines and two databases according to the resource allocation setting. And, the deploying module 222 installs the downloaded one or more software program on these three virtual machines and stores the registration settings, operation parameters and reserved storing spaces into these two databases. Thus, the cloud service system can automatically implement the virtual environment, which is needed by the new software. The implemented virtual environment includes the file system used by software or virtual resources (e.g. database, virtual machine).

In step S307, the database setting module 223 automatically sets a database structure and a default data corresponding to the target file. For instance, the installed software program is communication software, the database setting module 223 can automatically set the database structure (e.g. the columns of connect name, phone number, and address) and default data (e.g. default user account) of communication software.

By the step above mentioned, the cloud service system can selectively and automatically download a target file. In addition, the cloud service system can automatically deploy the resource implementation according to the resource allocation setting and automatically finish setting the database structure of target file and the default data. Therefore, the private cloud system 10 can start a series of automatic operation after making sure that user wants to download the target file from the public cloud system 12. In this way, the software on the public cloud system 12 can be quickly deployed on the private cloud system 10 of the enterprise. This can help employees of the enterprise to use the software conveniently by accessing the private cloud system 10.

Besides, in another embodiment, before performing the step S301, the transmitting module 210 transmits subscription information to the public cloud system 12 and receives a connection from the public cloud system. And then, transmitting module 210 downloads the target file to the private cloud system 10 according to the connection.

For example, after the software developer finishing developing the service, the software developer may upload the service product to the product market of public cloud system 12. Next, the user of private cloud system 12 (e.g. employees) can browse the product market of public cloud system 12 and purchase the product by transmitting subscription information by the transmitting module 210. After successfully purchasing the product, the public cloud system 12 generates a download link and transmits the download link to the private cloud system 10. Thus, the user of the private cloud system 10 can download the corresponding the purchased service to the private cloud system 10. And then, the step S301 is performed.

Figure 4:
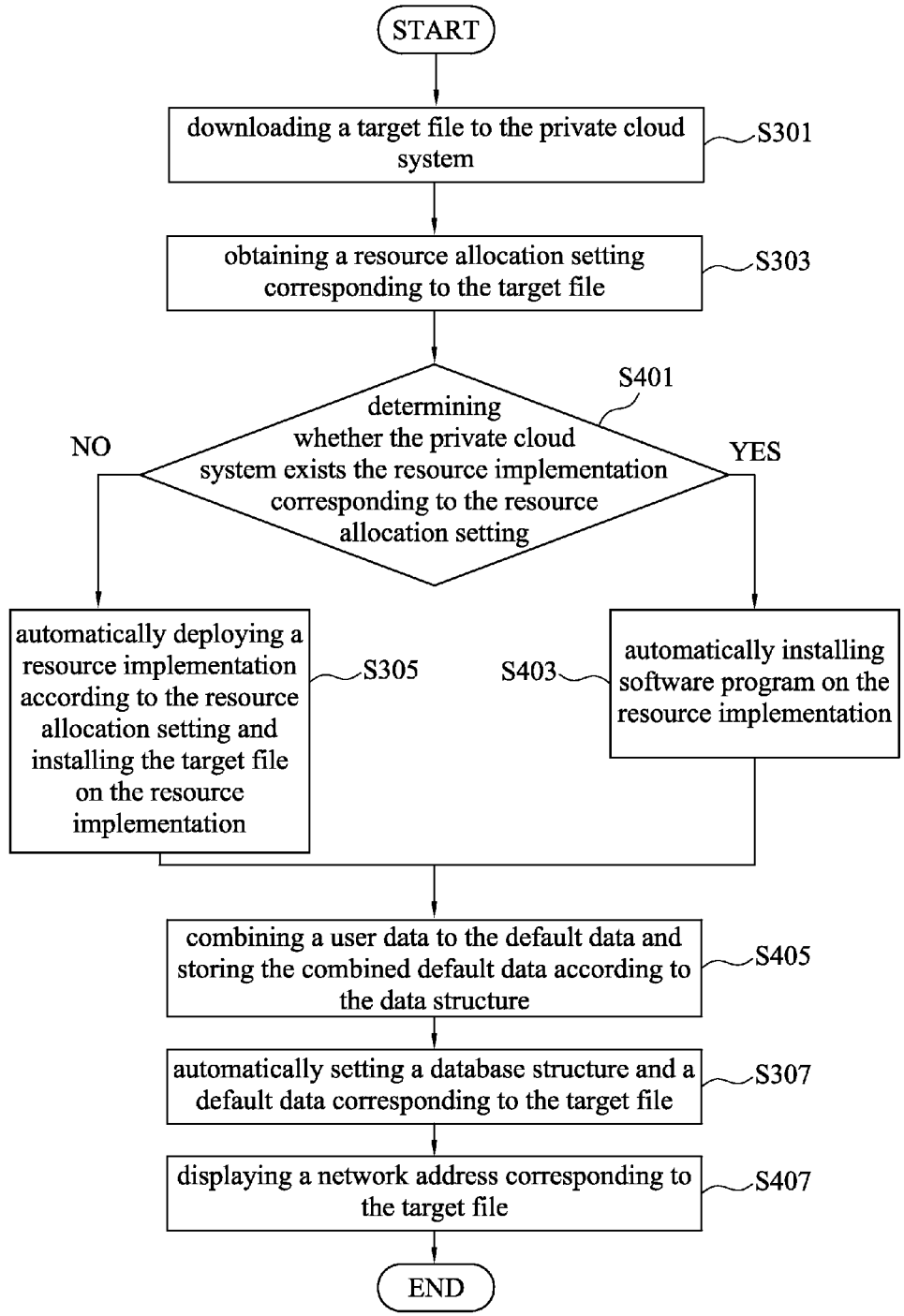
FIG. 4 is a flow chart of a cloud service method according to another embodiment of the disclosure.

Referring to FIG. 4, FIG. 4 is a flow chart of a cloud service method according to another embodiment of the disclosure. The difference between FIG. 4 and FIG. 3 is that FIG. 4 further comprises steps S401, S403, S405 and S407. In this embodiment, other steps are the same as FIG. 3. Thus, in this part of specification does not describe again.

In FIG. 4, after step S303 that the resource allocation module 221 obtains a resource allocation setting corresponding to the target file, the step S401 is performed.

In step S401, a resource implementation module determines whether the private cloud system 10 exists the resource implementation corresponding to the resource allocation setting. If the private cloud system 10 exists the resource implementation corresponding to the resource allocation setting, the step S403 is performed. In contrast, if the private cloud system 10 does not exist the resource implementation corresponding to the resource allocation setting, the step S305 is performed to enable resource implementation module to deploy resource implementation according to the resource allocation setting.

In step S403, the resource implementation module automatically installs software program on the resource implementation. Therefore, the private cloud system 10 has the condition to help software operate smoothly when the resource implementation module determines that the private cloud system 10 exists the corresponding resource implementation. Thus, the cloud service system can install the software program automatically to avoid wasting time of performing resource implementation again.

In one embodiment, after step S305 and S403, the step S405 is performed. In step S405, database setting module 223 combines a user data to the default data and stores the combined default data according to the data structure. For instance, if the installed software program is a calendar program, the database setting module 223 can fill in the information of existing calendar or the related user data of connects list to the installed calendar program and store the combined default data according to the data structure (e.g. date, event column).

In one embodiment, after S307 that the database setting module 223 automatically sets the database structure and the default data corresponding to the target file, the step S407 is performed. In step S407, a network address corresponding to the target file is set and displayed by the user operation interface. Therefore, user can be notified that the software can be used by a notification of message or e-mail. And then, user can operate the software by selecting the network address on the user operation interface of the electronic device 14, 16.

Figure 5:
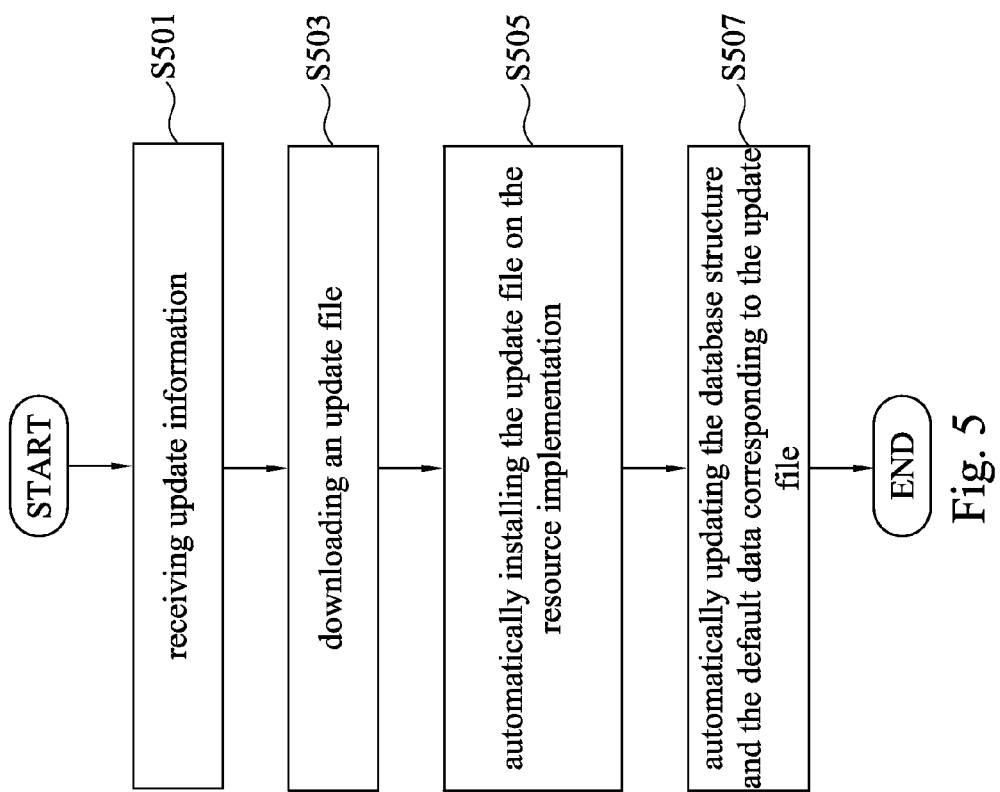
FIG. 5 is a flow chart of an update service of a cloud service method according to an embodiment of the disclosure.

In another embodiment, when software developer updates the new version of software and upload the updated software on the cloud market, the electronic device 14, 16 using the private cloud system 10 will receive notification. The notification records the update status of the software installed by user. The administrator can determine whether to update the version of software. The cloud service system 100 can process a serial operation of the updated service. Referring to FIG. 5, FIG. 5 is a flow chart of an update service of a cloud service method according to an embodiment of the disclosure.

In step S501, the transmitting module 210 receives update information. For example, the update information can be e-mail, a message or an electronic signal that enables the transmitting module 210 to download the file automatically.

In step S503, the transmitting module 210 downloads an update file. The update file corresponds to the update information.

In step S505, the deploying module 222 automatically installs the update file on the resource implementation.

In step S507, the database setting module 223 automatically updates the database structure and the default data corresponding to the update file.

Figure 6:
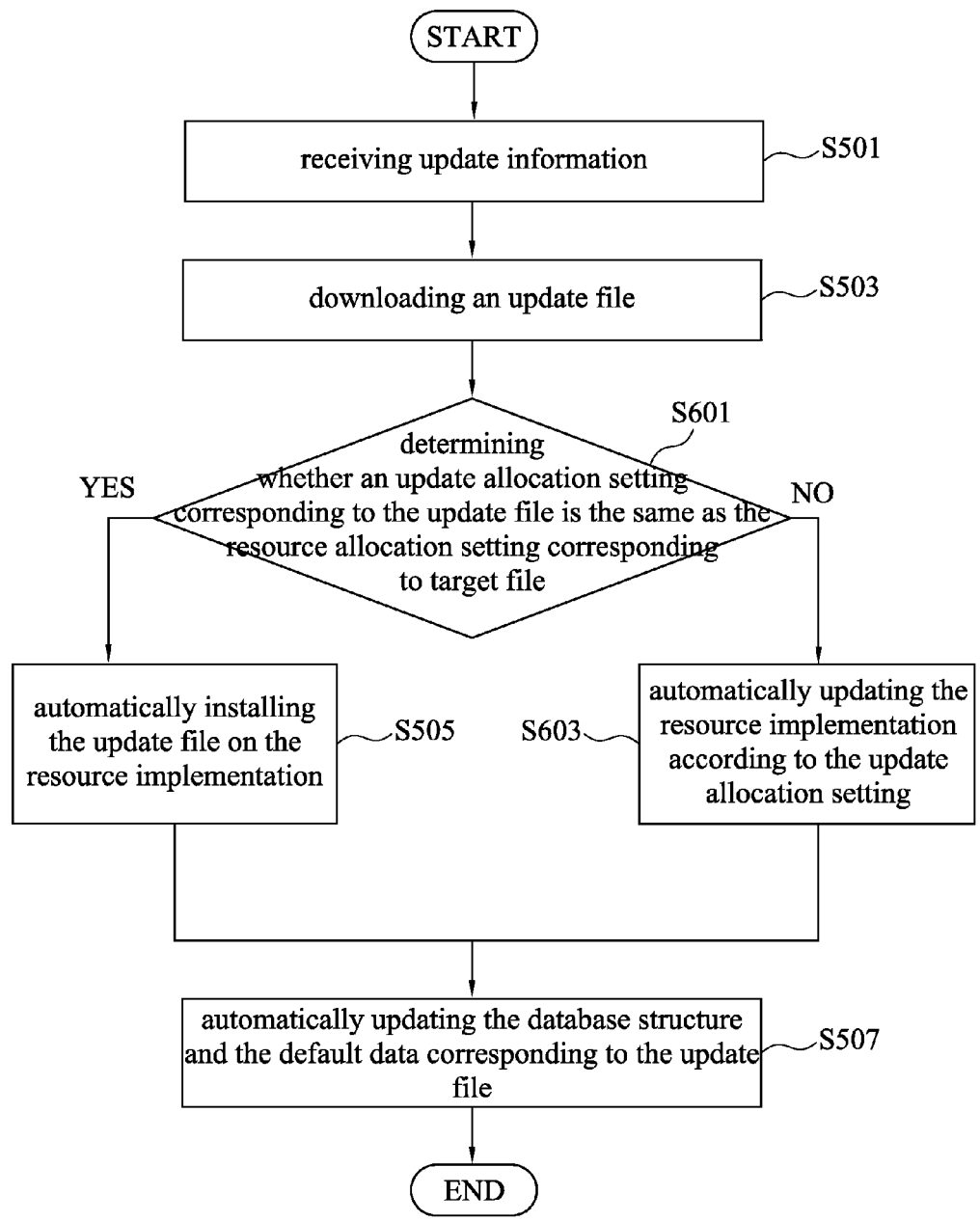
FIG. 6 is a flow chart of an update service of a cloud service method according to an embodiment of the disclosure.

Next, referring to FIG. 6, FIG. 6 is a flow chart of an update service of a cloud service method according to an embodiment of the disclosure. The difference between FIG. 5 and FIG. 6 is that FIG. 6 further comprises steps S601 and S603 after step S501. The steps S501, S503, S505, S507 are the same as FIG. 5. Thus, in this part of specification does not describe again.

In FIG. 6, after step S503 that the transmitting module 210 downloads the update file, the step S601 is performed.

In step S601, the resource implementation module determines whether an update allocation setting corresponding to the update file is the same as the resource allocation setting corresponding to target file. If the update allocation setting corresponding to the update file is the same as the resource allocation setting corresponding to target file, the step S505 is performed. In contrast, if the update allocation setting corresponding to the update file is not the same as the resource allocation setting corresponding to target file, the step S603 is performed.

In step S603, the resource implementation module automatically updates the resource implementation according to the update allocation setting. For example, if at least one of the setting in the update file is changed, such as adding the resource, the administrator can manually or automatically adjust the resource allocation by the resource implementation module and automatically update the resource implementation according to the update allocation setting.

The present disclosure provides a cloud service system and method thereof. The cloud service system and method can transfer the software system to the internal private cloud system of enterprise after the administrator or the common user subscripting the software. This can help the cloud service system quickly deploy the whole software system. The internal administrator of enterprise or common user can determine whether uses the current environment architecture or creates a set of new environment architecture to meet the original settings of the software. After user subscribing the software, the cloud service system can start to perform a serial of automatic operations to install the software into the private cloud system. In addition, the cloud service system can automatically download the new version of the software if the updated software is released.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A cloud service method, comprising:
    downloading a target file to a private cloud system;
    obtaining a resource allocation setting corresponding to the target file from a public cloud system, wherein the target file comprises a software program and environment setting information corresponding to the software program, and the step of obtaining the resource allocation setting corresponding to the target file comprises:
    adjusting the environment setting information or using default environment setting information to determine the resource allocation setting;
    automatically deploying a resource implementation according to the resource allocation setting and installing the target file on the resource implementation, wherein the step of automatically deploying the resource implementation according to the resource allocation setting comprises:
    determining whether the resource implementation corresponding to the resource allocation setting exists in the private cloud system; if the resource implementation corresponding to the resource allocation setting exists in the private cloud system, automatically installing the software program on the resource implementation; and if the resource implementation corresponding to the resource allocation setting does not exist in the private cloud system, automatically deploying the resource implementation according to the resource allocation setting;
automatically setting a database structure and default data corresponding to the target file;
setting a network address corresponding to the target file;
displaying the network address on a user operation interface;
transmitting a notification;
receiving update information;
downloading an update file;
automatically installing the update file on the resource implementation; and
automatically updating the database structure and the default data corresponding to the update file;
wherein the step of automatically installing the update file on the resource implementation comprises:
determining whether an update allocation setting corresponding to the update file is the same as the resource allocation setting corresponding to the target file;
if the update allocation setting corresponding to the update file is not the same as the resource allocation setting corresponding to the target file, automatically updating the resource implementation according to the update allocation setting; and
if the update allocation setting corresponding to the update file is the same as the resource allocation setting corresponding to the target file, directly installing the update file on the resource implementation.

2. The cloud service method of claim 1, further comprising: before the step of automatically setting the database structure and the default data corresponding to the target file:
combining user data with the default data, and storing the combined user data and default data according to the database structure.

3. The cloud service method of claim 1, further comprising:
before the step of downloading the target file to the private cloud system:
transmitting subscription information to the public cloud system;
receiving a connection from the public cloud system; and
downloading the target file to the private cloud system according to the connection.

4. A service system, comprising:
a transmitting circuit for downloading a target file to a private cloud system;
at least one non-transitory computer-readable medium storing instructions; and
a processor executing the instructions for:
obtaining a resource allocation setting corresponding to the target file from a public cloud system through the transmitting circuit, wherein the target file comprises a software program and environment setting information corresponding to the software program, and the processor further adjusts the environment setting information or uses default environment setting information to determine the resource allocation setting;
automatically deploying a resource implementation according to the resource allocation setting and installing the target file on the resource implementation, wherein the processor further determines whether the resource implementation corresponding to the resource allocation setting exists in the private cloud system; if the resource implementation corresponding to the resource allocation setting exists in the private cloud system, the processor automatically installs the software program on the resource implementation; and if the resource implementation corresponding to the resource allocation setting does not exist in the private cloud system, the processor automatically deploys the resource implementation according to the resource allocation setting;
automatically setting a database structure and default data corresponding to the target file;
setting a network address corresponding to the target file;
displaying the network address on a user operation interface;
transmitting a notification;
receiving update information;
downloading an update file;
automatically installing the update file on the resource implementation; and
automatically updating the database structure and the default data corresponding to the update file;
wherein the step of automatically installing the update file on the resource implementation comprises:
determining whether an update allocation setting corresponding to the update file is the same as the resource allocation setting corresponding to the target file;
if the update allocation setting corresponding to the update file is not the same as the resource allocation setting corresponding to the target file, automatically updating the resource implementation according to the update allocation setting; and
if the update allocation setting corresponding to the update file is the same as the resource allocation setting corresponding to the target file, directly installing the update file on the resource implementation.

* * * * *